US005490037A

United States Patent [19]
Clancy

[11] Patent Number: 5,490,037
[45] Date of Patent: Feb. 6, 1996

[54] FLEXING KEYBOARD STRUCTURE FOR A NOTEBOOK COMPUTER

[75] Inventor: Kevin F. Clancy, Spring, Tex.

[73] Assignee: Compaq Computer Corporation, Houston, Tex.

[21] Appl. No.: 268,622

[22] Filed: Jun. 30, 1994

[51] Int. Cl.⁶ .............................. G06F 1/16; H05K 7/02
[52] U.S. Cl. ........................................ 361/680; 400/488
[58] Field of Search .................... 400/488, 489, 400/682; 364/708.1, 709.12; 345/168; 235/145 R; 200/5 A; 361/680

[56] References Cited

U.S. PATENT DOCUMENTS

| | | | |
|---|---|---|---|
| 4,528,428 | 7/1985 | Gotoh et al. | 361/680 X |
| 5,262,762 | 11/1993 | Westover et al. | 400/682 X |

FOREIGN PATENT DOCUMENTS

| | | | |
|---|---|---|---|
| 84/00518 | 2/1984 | WIPO | 400/488 |

Primary Examiner—Michael W. Phillips
Attorney, Agent, or Firm—Konneker & Bush

[57] ABSTRACT

A notebook computer has a keyboard structure with a flexible top side portion disposed along the top side of its base housing to which the computer lid portion is secured for movement between a closed position in which the lid portion extends across and covers the top side of the base housing and the keyboard structure, and an open position in which the lid portion is generally transverse to the base housing and uncovers the keyboard structure. The flexible top side portion of the keyboard structure is linked to the computer lid portion in a manner such that when the lid portion is closed the top side portion of the keyboard structure is essentially flat and parallel to the bottom side of the base housing, and when the lid portion is opened, the top side portion of the keyboard structure is resiliently bent to an upwardly and rearwardly sloped orientation and concavely curved in an upward direction to thereby emulate the slope, curvature and typing feel of a sculpted desktop computer keyboard.

22 Claims, 2 Drawing Sheets

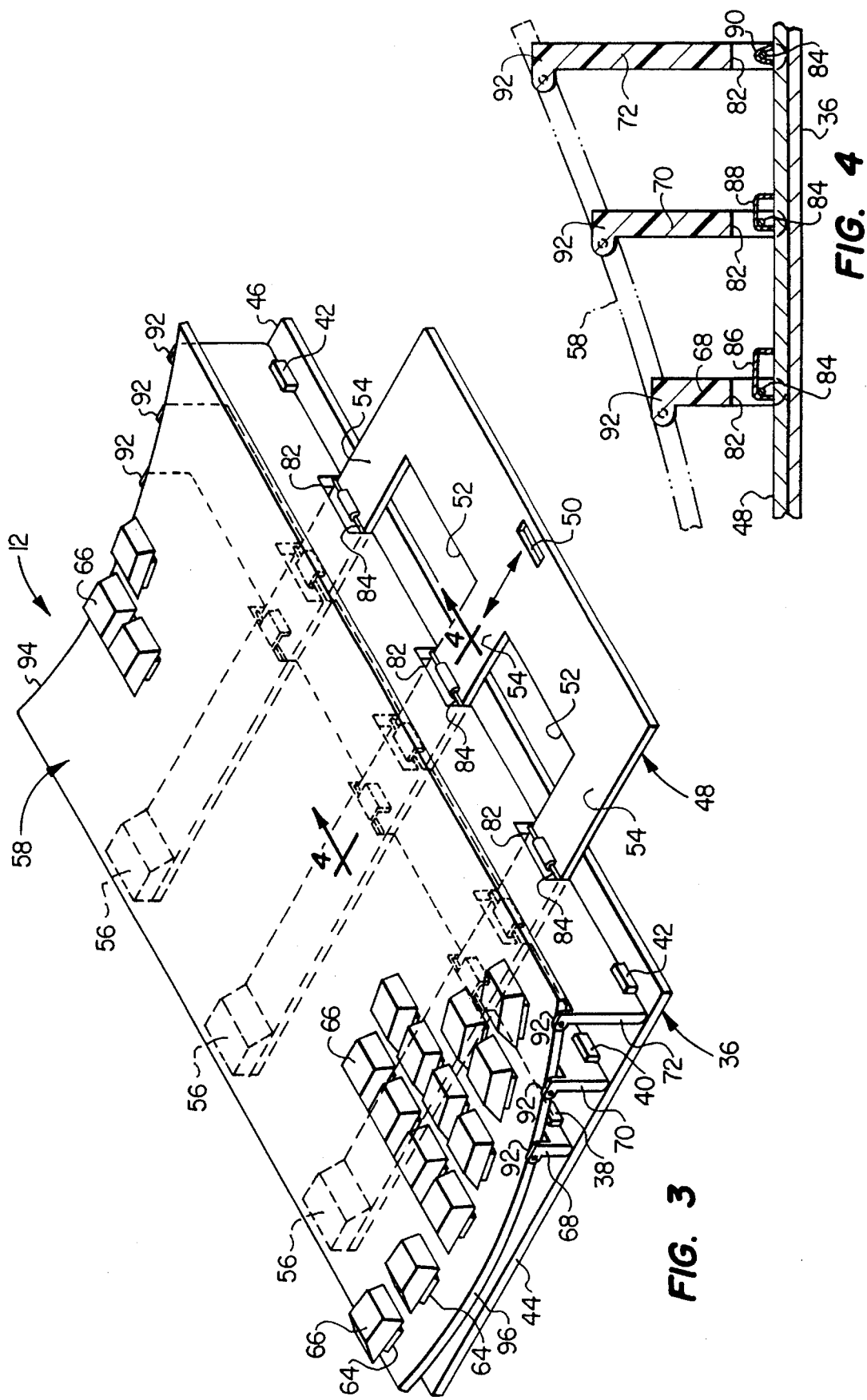

FLEXING KEYBOARD STRUCTURE FOR A NOTEBOOK COMPUTER

BACKGROUND OF THE INVENTION

1. Field of the Invention

The present invention relates generally to computer apparatus and, in a preferred embodiment thereof, more particularly relates to keyboard structures for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

A continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard. A feature which has previously been built into a desktop computer keyboard is a "sculpted" configuration in which the keyboard is upwardly and rearwardly tilted and given an upwardly concave configuration to improve typing comfort. This has been done on desktop keyboards by bending the components onto a rigid curved base structure with the keyboard remaining permanently flexed.

While this keyboard curvature is considered by many users to increase typing comfort, such configuration has not heretofore been practical in the realm of notebook or other portable computer keyboard computers due to its undesirable increase in the vertical space which would be occupied by the keyboard in the computer in its closed storage and transport orientation. It is accordingly an object of the present invention to provide, in a portable computer such as a notebook computer, a keyboard structure having both an upwardly convex typing configuration emulating that of a sculpted desktop keyboard, and a storage/transport thickness not appreciably greater than that of a conventional flat portable computer keyboard structure.

SUMMARY OF THE INVENTION

In carrying out principles of the present invention, in accordance with a preferred embodiment thereof, a portable computer, representatively a notebook computer, is provided with a specially designed flexible keyboard structure. The computer includes a base housing having a top side, a bottom side, and opposed front and rear sides. A lid housing is secured to the rear side of the base housing for pivotal movement relative thereto between a closed position in which the lid housing extends across and covers the base housing top side, and an open position in which the lid housing uncovers and exposes the base housing top side.

The flexible keyboard structure extends across the top side of the base housing and includes a flexible upper side portion upon which a series of key members are operatively carried, the upper side portion of the keyboard structure being resiliently bendable between an essentially flat storage and transport orientation in which the upper side portion is essentially parallel to the top side of the base housing, and a use orientation in which the upper side portion of the keyboard structure is resiliently bent to an upwardly concave curvature and preferably slopes in a rearward and upward direction relative to the base housing.

Linkage means interconnect the lid housing and the flexible upper side portion of the keyboard structure. The linkage means are operative to (1) position the upper side portion of the keyboard in its storage and transport orientation in response to movement of the lid housing to its closed position, and (2) position the upper side portion of the keyboard in its use orientation in response to movement of the lid housing to its open position.

In this manner the keyboard structure in its flat storage and transport orientation is not appreciably thicker than portable computer keyboard structures of conventional constructions. In its sloped and curved use orientation, however, the keyboard structure advantageously emulates the comfortable shape and typing feel of a sculpted desktop computer keyboard.

BRIEF DESCRIPTION OF THE DRAWINGS

FIG. 3 is a simplified perspective view of the keyboard structure in its flexed orientation;

FIG. 4 is an enlarged scale, simplified cross-sectional view through a portion of the keyboard structure, taken along line 4—4 of FIG. 3, illustrating pivotally mounted support members used to upwardly bend a rear portion of the keyboard structure when the computer is opened.

DETAILED DESCRIPTION

Figure 1:
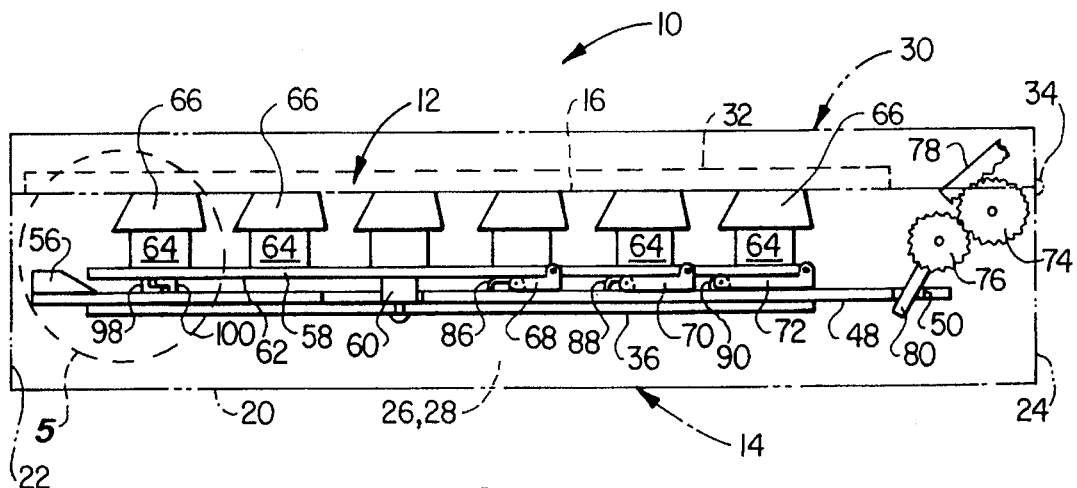
FIG. 1 is a partially phantomed schematic side elevational view of a representative notebook computer, in its closed position, incorporating therein a specially designed flexing keyboard structure embodying principles of the present invention.
Figure 2:
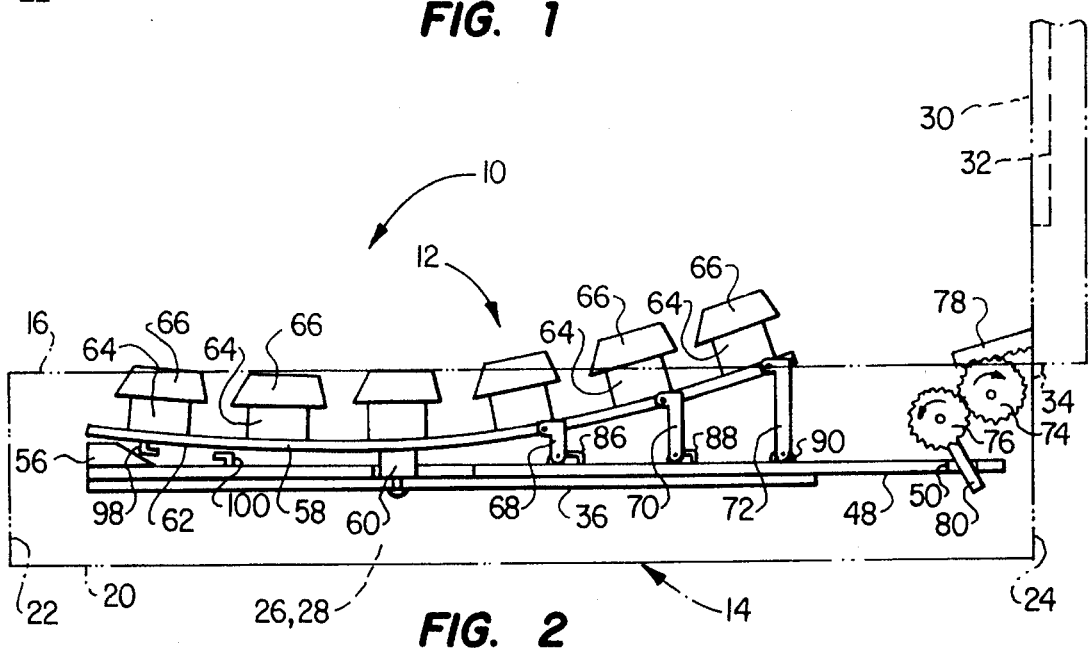
FIG. 2 is a view similar to that in FIG. 1, but with the computer in its opened position.

Referring initially to FIGS. 1 and 2, the present invention provides a portable computer, illustratively a notebook computer 10, having incorporated therein a specially designed flexing keyboard structure 12 embodying principles of the present invention. Computer 10 includes a hollow rectangular base housing 14 having an open top side 16; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 34 to a top rear corner portion of the base housing 14. Lid housing 30 may upwardly pivoted to place the computer 10 in an open use orientation (FIG. 2) in which the top side 16 of the base housing 14 is exposed and the display screen 32 forwardly faces the user of the computer, or downwardly pivoted to place the computer 10 in a closed storage and transport orientation (FIG. 1) in which the lid housing extends across and covers the top side of the base housing 14. Suitable latch means (not shown) are provided to releasably retain the lid housing 30 in its FIG. 1 closed orientation.

Referring now to FIGS. 1–3, the flexing keyboard structure 12 of the present invention extends across an upper portion of the interior of the base housing 14, adjacent its open upper side 16, and includes a horizontally oriented rigid support plate 36 anchored within the interior of the base housing 14 and forming the base of the flexing keyboard structure 12. For purposes later described, three spaced apart stop projections 38,40,42 (see FIG. 3) are formed on the top side of the support plate 36 adjacent each of its opposite ends 44,46.

A rigid position adjusting plate member 48 is suitably secured to the top side of the support plate 36 for sliding front-to-rear movement relative thereto. A central rear portion of the plate member 48 has a slot 50 formed therein, and a pair of rectangular openings 52 are formed in the plate member, forwardly of the slot 50, to define thereon three arm portions 54 extending between and joining front and rear sections of the plate 48. As best illustrated in FIGS. 1 and 2, upwardly projecting wedge members 56 extend across the top sides of the position adjusting plate arms 56 at their front ends.

The flexing keyboard structure 12 also includes a generally conventional multi-layer membrane type flexible signal pad structure 58 which overlies the position adjusting plate 48 and has a central portion 60 anchored to the rigid support plate 36. The bottom side of the flexible signal pad structure 58 is defined by a resiliently bendable metal plate member 62. Disposed atop the metal plate member 62 are the usual series of plastic sheets upon which various keystroke detection and output circuitry is operatively disposed. The top or dome sheet layer of the pad structure 58 has a spaced series of resilient elastomeric key return domes 64 which underlie a series of key cap members 66 operatively secured to the top side of the pad structure 58.

In a conventional manner, when a given key cap member 66 is manually depressed a portion of the signal pad circuitry is engaged and responsively outputs an electrical signal indicative of the depression of the key cap member. When the key cap member is released, its associated dome member 64 automatically returns it to its normal vertically extended position.

According to a primary feature of the present invention, an upper side portion of the overall keyboard structure 12, namely the signal pad structure 58 that operatively carries the key cap members 66, is selectively and resiliently bendable between an essentially flat storage and transport orientation (FIG. 1), in which the signal pad structure 58 is generally parallel to the bottom wall 20 of the base housing 14, and a use orientation (FIG. 2) in which the top side of the keyboard structure is tilted upwardly and rearwardly and has an upwardly concave curvature giving it the "sculpted" use configuration of a desktop computer keyboard.

In a manner which will now be described, the flexing keyboard structure 12 is automatically moved to its FIG. 1 flat storage and transport orientation in response to closing the lid housing 30, and is automatically moved to its FIG. 2 use orientation (see FIG. 3 also) in response to opening the lid housing 30. Accordingly, in its flat storage and transport orientation the keyboard structure 12 has a vertical thickness comparable to that of a conventional notebook computer keyboard, and in its use orientation the flexing keyboard structure 12 is provided with an upwardly curved, vertically thicker configuration that emulates the shape and typing feel of a sculpted desktop keyboard.

Referring now to FIGS. 1–4, the flexible multi-layer signal pad structure 58 is associated with the lid housing 30 for movement between the FIG. 1 and 2 positions of the pad structure 58 in response to opening and closing of the lid housing 30 by linkage means that include the movable position adjusting plate 48, three rectangular pivot plate members 68,70 and 72, and a pair of intermeshed circular gear members 74,76 rotatably supported within a rear portion of the base housing 14. Gear 74 is linked to the lid housing 30 by a rack member 78 secured to the lid housing adjacent its hinge joint 74 and intermeshed with a top side portion of the gear 74. Gear 76 is drivingly linked to the position adjusting plate 48 by a lever 80 fixedly secured to the gear 76, projecting radially outwardly therefrom, and extending downwardly through the rear side slot 50 in the position adjusting plate 48.

A rear side portion of the flexible signal pad structure 58 is linked to the position adjusting plate 48 by the three pivot plate members 68,70 and 72, with plate member 68 being positioned forwardly of plate member 70 which, in turn, is positioned forwardly of plate member 72. As best illustrated in FIGS. 3 and 4, bottom side edge portions of the plate members 68,70,72 have three notches 82 formed therein, and mounting pins 84 extend horizontally across the notches 82. The pins 84 pivotally secure lower side edge portions of the pivot plate members 68,70,72 to the position adjustment plate 48 and are received in sets of three upturned eye members 86,88,90 formed on each of the arm portions 54 of the plate 48.

Upper corner portions 92 of the pivot plate members 68,70,72 are transversely enlarged and are pivotally secured, as best illustrated in FIG. 3, to the opposite ends 94,96 of the flexible signal pad structure 58. The width of the front pivot plate member 68 (between its pivot points) is less than the width of the intermediate pivot plate member 70 which, in turn, is less than the width of the rear pivot plate member 72.

Additionally, to accommodate the pivotal and translational movement of the plates 68,70,72 as later described herein, the vertical heights and horizontal widths of the eyes 86,88,90 are varied as best indicated in FIG. 4. Specifically, the width of the eye 86 is greater than the width of eye 88 which, in turn, is greater than the width of eye 90. The height of eye 86 is less than the height of eye 88 which, in turn, is less than the height of eye 90.

Figure 5:
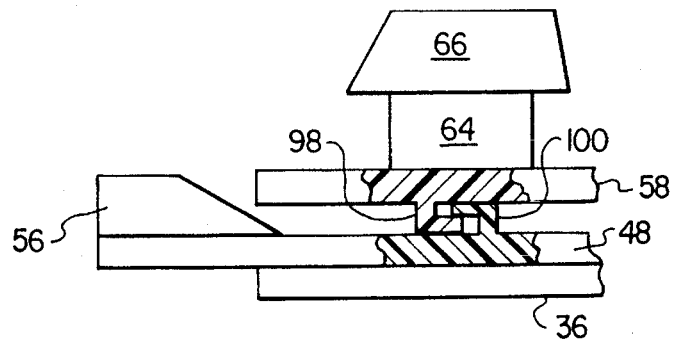
FIG. 5 is an enlargement of the circled area "5" in FIG. 1.

With the flexible keyboard structure in its flat FIG. 1 storage and transport orientation, the signal pad structure 58 is essentially parallel to the bottom base housing wall 20, the wedge members 56 are disposed forwardly of the front end of the signal pad structure 58, and the signal pad structure is releasably secured in its flat orientation by a spaced plurality of rearwardly opening hook members 98 (see FIG. 5) disposed on a front underside portion of the signal pad structure 58 and releasably interlocked with a spaced plurality of forwardly opening hook members 100 disposed on a front upper side portion of the position adjusting plate 48.

As the lid housing 30 is opened, as indicated in FIG. 2, the gear 74 is driven in a clockwise direction, thereby rotating the gear 66 and its associated lever 80 in a counterclockwise direction. As the lever 80 is driven in a counterclockwise direction it rearwardly drives the position adjusting plate 48 relative to the rigid support plate 36 and the flexible signal pad structure. This rearward driven movement of the position adjusting plate 48 rearwardly drives the wedge members 56 between front portions of the support plate 36 and the flexible signal pad structure 58, thereby upwardly bending a front portion of the signal pad structure as indicated. As may be seen by comparing FIGS. 1 and 2, the rearward movement of the position adjusting plate 48 disengages the hook members 98 from the hook members 100, thereby permitting the upward bending of a front portion of the signal pad structure 58.

The rearward driven movement of the position adjusting plate 48 also forcibly translates the bottom side edges of the pivot plate members 68,70,72 in a rearward direction, until they are brought into engagement with the stop projections 38,40 and 42 (see FIG. 3), and at the same time forcibly pivots the plate members 68,70,72 in counterclockwise directions about their bottom side edges to their indicated upright positions in which the upright plate members 68,70, 72 upwardly bend a rear portion of the flexible signal pad structure.

Accordingly, as illustrated in FIG. 2, the interaction of the wedge member 56 and the pivot plate members 68,70,72 with the flexible signal pad structure 58 in response to the opening of the lid housing 30 holds the signal pad structure 58 in a rearwardly and upwardly sloped use orientation in which an upper side portion of the overall keyboard structure assumes an upwardly concave curvature that emulates the sculpted configuration of a similarly sloped and curved desktop computer keyboard.

As the lid housing 30 is subsequently closed, the gear 74 is rotated in a counterclockwise direction, and the gear 76 and its associated lever 80 are driven in clockwise directions. The clockwise movement of the lever 80 forwardly drives the position plate 48 relative to the support plate 36 and the signal pad structure 58, thereby removing the wedge members 56 from between the signal pad structure 58 and the support plate 36, collapsing the pivot plate members 68,70,72 to their FIG. 1 orientations, and returning the signal pad structure 58 to its FIG. 1 flat storage and transport orientation. As the position adjusting plate 48 is forwardly returned to its FIG. 1 position, the hook members 98 are again engaged with their associated hook members 100 to hold the signal pad structure in its flat storage and transport orientation.

The foregoing detailed description is to be clearly understood as being given by way of illustration and example only, the spirit and scope of the present invention being limited solely by the appended claims.

What is claimed is:

1. A portable computer comprising:

a base housing having a top side, a bottom side, and opposed front and rear sides;

a lid housing secured to said rear side of said base housing for pivotal movement relative thereto between a closed position in which said lid housing extends across and covers said top side, and an open position in which said lid housing uncovers and exposes said top side;

a keyboard structure extending across said top side of said base housing and including a flexible upper side portion upon which a series of key members are operatively carried, said upper side portion of said keyboard structure being resiliently bendable between an essentially flat storage and transport orientation in which said upper side portion is essentially parallel to said top side of said base housing, and a use orientation in which said upper side portion of said keyboard structure is resiliently bent to an upwardly concave curvature; and linkage means interconnecting said lid housing and said flexible upper side portion of said keyboard structure, said linkage means being operative to (1) position said upper side portion in said storage and transport orientation in response to movement of said lid housing to its closed position, and (2) position said upper side portion in said use orientation in response to movement of said lid housing to its open position.

2. The portable computer of claim 1 wherein:

said portable computer is a notebook computer.

3. The portable computer of claim 1 wherein said upper side portion of said keyboard structure, in said use orientation thereof, is upwardly and rearwardly sloped relative to said base housing.

4. The portable computer of claim 1 wherein:

said flexible upper side portion of said keyboard structure has front and rear sections, and said rear section is bent further upwardly than said front section when said flexible upper side portion of said keyboard structure is in said use orientation thereof.

5. The portable computer of claim 1 wherein:

said keyboard structure further includes a rigid support plate member underlying said flexible upper side portion of said keyboard structure and anchored to said base housing in a parallel relationship with said top side of said base housing, and anchored to a central portion of said flexible upper side portion, and a position adjusting plate member sandwiched between said upper side portion and said support plate member and being movable relative to said upper side portion and said support plate member, and said linkage means include:

first means for rearwardly moving said position adjusting plate member relative to said support plate member and said flexible upper side portion of said keyboard structure in response to opening said lid housing, and for forwardly moving said position plate member relative to said support plate member and said flexible upper side portion of said keyboard structure in response to closing said lid housing, and second means, carried by said position adjusting plate member, for upwardly bending front and rear sections of said flexible upper side portion of said keyboard structure in response to rearward movement of said position plate member relative to said support plate member and said flexible upper side portion of said keyboard structure, and for permitting said flexible upper side portion to return to said storage and transport orientation in response to forward movement of said position adjusting plate member relative to said support plate member and said flexible upper side portion of said keyboard structure.

6. The portable computer of claim 5 wherein said flexible upper side portion of said keyboard structure includes a multi-layer membrane type signal pad structure with a top side having a spaced series of resilient key return dome members mounted thereon and operatively supporting said key members.

7. The portable computer of claim 5 wherein said first means include gear means interconnected between said lid housing and said position adjusting plate member.

8. The portable computer of claim 7 wherein:

said position adjusting plate member has a rear side edge section with an opening formed therein, and said gear means include:

a first gear member carried by said lid housing, a second gear member rotatably carried by said base housing and intermeshed with said first gear member, a third gear member rotatably carried by said base housing and intermeshed with said second gear member, and a lever member fixedly secured to said third gear member, projecting outwardly therefrom, and received in said opening in said position adjusting plate member.

9. The portable computer of claim 5 wherein said second means include:

a wedge member carried by a front portion of said position adjusting plate member and configured to be moved between front portions of said support plate member and said flexible upper side portion of said keyboard structure in response to rearward movement of said position adjusting plate member relative to said support plate member and said flexible upper side portion of said keyboard structure.

10. The portable computer of claim 5 wherein said second means include:

a plurality of pivot members mutually spaced apart in a front-to-rear direction and each having spaced apart first and second portions respectively pivoted to a rear section of said flexible upper side portion of said keyboard structure and said position adjusting plate member, said pivot members being generally parallel to said support plate member when said flexible upper side portion of said keyboard structure is in said storage and transport orientation thereof, and generally perpendicular to said support plate member when said flexible upper side portion of said keyboard structure is in said use orientation thereof.

11. The portable computer of claim 10 wherein:

said pivot members have generally plate-shaped configurations, and said first and second portions of said pivot members are side edge portions thereof.

12. The portable computer of claim 10 further comprising:

a spaced plurality of stop projections formed on the top side of said support plate member and positioned to engage and terminate the rearward movement of said second portions of said pivot members during rearward movement of said position adjusting plate member relative to said support plate member and said flexible upper side portion of said keyboard structure.

13. The portable computer of claim 1 further comprising:

locking means for releasably locking a front section of said flexible upper side portion of said keyboard structure to said position adjusting plate member in response to forward movement of said position adjusting plate member relative to said support plate member and said flexible upper side portion of said keyboard structure to return said flexible upper side portion of said keyboard structure to said storage and transport orientation thereof.

14. The portable computer of claim 13 wherein said locking means include releasably interlockable first and second hook members respectively disposed on the underside of said flexible upper side portion of said keyboard structure and the upper side of said position adjusting plate member.

15. A flexible keyboard structure for a portable computer, comprising:

a rigid support plate member having a top side and front and rear edge portions;

a multi-layer signal pad structure having a top side and being positioned in a spaced apart, facing relationship with said top side of said support plate member and having a central portion anchored to said support plate member, said signal pad structure being resiliently bendable from a storage and transport orientation in which said signal pad structure is essentially parallel to said support plate member, and a use orientation in which said signal pad structure is bent to an upwardly concave curvature relative to said support plate member;

a series of keys operatively supported on said top side of said signal pad structure;

a position adjusting plate member sandwiched between said support plate member and said signal pad structure for rearward movement relative thereto to a rear limit position, and forward movement relative thereto to a front limit position; and adjustment means, carried by said position adjusting plate member, for moving said signal pad structure to said storage and transport orientation thereof in response to movement of said position adjusting plate member from said rear limit position thereof to said front limit position thereof, and for moving said signal pad structure to said use orientation in response to movement of said position adjusting plate member from said front limit position thereof to said rear limit position thereof.

16. The flexible keyboard structure of claim 15 wherein:

said signal pad structure, in said use orientation thereof, is sloped rearwardly and upwardly relative to said support plate member.

17. The flexible keyboard structure of claim 15 wherein said adjustment means include:

a wedge member carried by a front portion of said position adjusting plate member and configured to be moved between front portions of said support plate member and said signal pad structure in response to rearward movement of said position adjusting plate member relative to said signal pad structure and said support plate member.

18. The flexible keyboard structure of claim 15 wherein said adjustment means include:

a plurality of pivot members mutually spaced apart in a front-to-rear direction and each having spaced apart first and second portions respectively pivoted to a rear section of said signal pad structure and said position adjusting plate member, said pivot members being generally parallel to said support plate member when said signal pad structure is in said storage and transport orientation thereof, and generally perpendicular to said support plate member when said signal pad structure is in said use orientation thereof.

19. The flexible keyboard structure of claim 18 wherein:

said pivot members have generally plate-shaped configurations, and said first and second portions of said pivot members are side edge portions thereof.

20. The flexible keyboard structure of claim 18 further comprising:

a spaced plurality of stop projections formed on the top side of said support plate member and positioned to engage and terminate the rearward movement of said second portions of said pivot members during rearward movement of said position adjusting plate member relative to said support plate member and said signal pad structure.

21. The flexible keyboard structure of claim 15 further comprising:

locking means for releasably locking a front section of said signal pad structure to said position adjusting plate member in response to forward movement of said position adjusting plate member relative to said support plate member and said signal pad structure to return said signal pad structure to said storage and transport orientation thereof.

22. The flexible keyboard structure of claim 21 wherein said locking means include releasably interlockable first and second hook members respectively disposed on the underside of said signal pad structure and the upper side of said position adjusting plate member.

* * * * *